Nov. 19, 1968  R. L. JENKINS ET AL  3,412,392
POTENTIAL LEVEL INDICATING CIRCUIT
Filed April 7, 1965
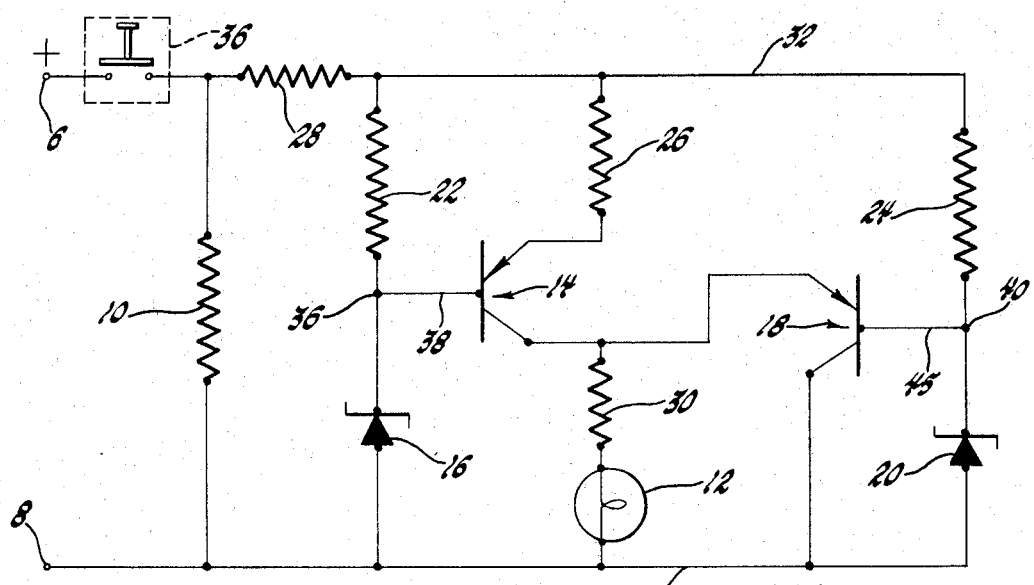
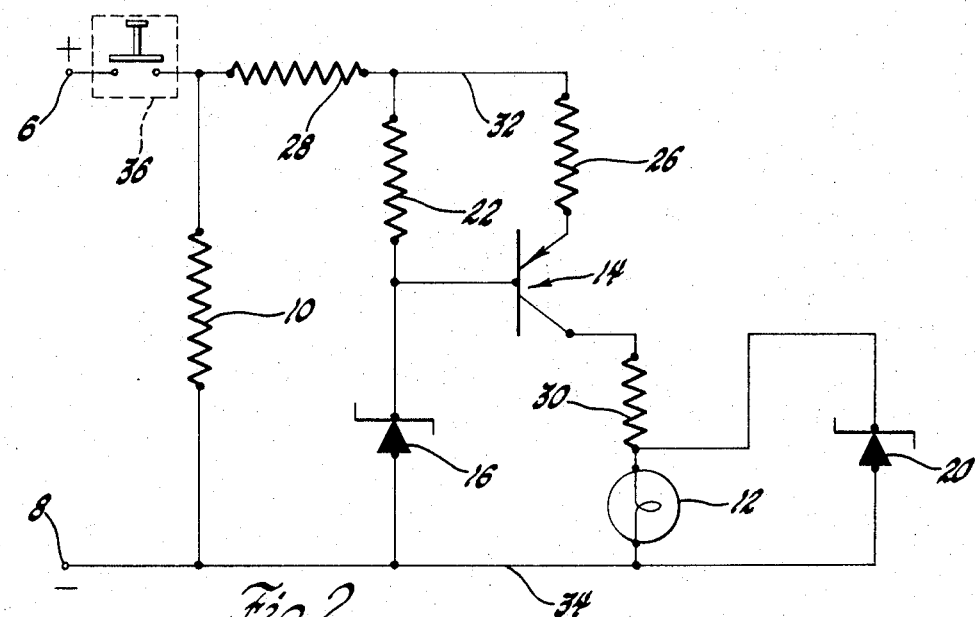
INVENTORS
RICHARD L. JENKINS
KENNETH S. VOGT
J DANE RIDENOUR
BY *Richard G. Stahr*
ATTORNEY

# United States Patent Office 3,412,392
Patented Nov. 19, 1968

3,412,392
POTENTIAL LEVEL INDICATING CIRCUIT
Richard L. Jenkins, Kenneth S. Vogt, and J. Dane Ridenour, Kokomo, Ind., assignors to General Motors Corporation, Detroit, Mich., a corporation of Delaware
Filed Apr. 7, 1965, Ser. No. 446,306
2 Claims. (Cl. 340—248)

ABSTRACT OF THE DISCLOSURE

A potential level indicating circuit which provides for the protection of the indicating device against destruction with overpotential conditions. The current carrying electrodes of a transistor and an indicating device, such as an electric lamp, are connected in series across the input circuit terminals. The base electrode of the transistor is connected to a circuit responsive to a first preselected potential magnitude for producing emitter-base current flow therethrough to trigger the transistor conductive thereby completing an energizing circuit for the indicating device. Connected in parallel with the indicating device only is a second circuit responsive to a second higher potential for completing a shunt circuit around the indicating device, thereby preventing the destruction thereof with potentials greater than its rated maximum.

---

This invention relates to potential level indicating devices and, more specifically, to potential level indicating devices having an overpotential protection feature.

Frequently, it is desirable to quickly and accurately determine only whether an unknown potential level is greater or less than a predetermined magnitude without concern as to the precise value.

In these instances, an indication that the unknown potential level is or is not of a desired magnitude is all that is necessary. That is, a simple "yes-no" determination.

As the potentials to be tested are of an unknown magnitude, the possibility of exceeding the potential rating of the testing circuitry and elements is ever present. Therefore, to prevent damage or destruction of the circuitry or certain components thereof, an overpotential protection feature is desirable with circuits of this type.

It is, therefore, an object of this invention to provide an improved potential level indicating device.

It is another object of this invention to provide an improved potential level indicating device having an overpotential protection feature.

In accordance with this invention, a potential level indicating device having an overpotential protective feature is provided wherein a first potential sensitive circuit device produces a control potential for triggering to conduction a first controllable switching device, connected in series with an indicating device across the input terminals, with applied potentials in excess of a predetermined minimum and a second potential sensitive circuit device produces a control potential with applied potential exceeding a predetermined maximum for triggering to conduction a second controllable switching device which is connected in shunt around the indicating device for establishing a potential limiting circuit across the indicating device to prevent its destruction with applied potentials above its normal potential rating.

For a better understanding of the present invention together with additional objects, advantages and features thereof, reference is made to the following description and accompanying drawings in which:

FIGURE 1 is a schematic diagram of the circuitry of the device of this invention, and FIGURE 2 is a schematic diagram of the circuitry of the device of this invention showing an alternate form of the overpotential protection feature.

Referring to FIGURE 1 of the drawing which sets forth the circuitry of the device of this invention in schematic form, the unknown potential to be tested is applied across input terminals 6 and 8. For proper operation, the applied potential should be poled as shown in the drawing.

To simulate a load upon the unknown source, a load resistor 10 is connected across input terminals 6 and 8. This load resistor stabilizes the unknown potential source and establishes the normal potential level thereof.

Connected in shunt across input terminals 6 and 8 through lines 32 and 34 is the series combination of an indicating device, herein schematically shown as an incandescent lamp 12, and a controllable switching device, herein schematically shown as a type PNP transistor 14 having the usual control or base, emitter and collector electrodes. With applied potentials across input terminals 6 and 8 exceeding a predetermined magnitude, switching transistor 14 will conduct, thereby establishing an energizing circuit for lamp 12 which will give a visual indication that the applied potential is at least in excess of a value which has been established as minimum as determined by the requirements of the circuitry with which this potential is to be used. As the required potential level may be different for different applications and since this circuitry is sufficiently flexible to accommodate a wide range of potential levels from which one may be selected, specific values will not be set forth in this specification.

A potential sensitive circuit device characterized by the abiilty to become conductive with applied potentials exceeding its rated value, herein shown as a Zener diode 16, is connected in shunt across input terminals 6 and 8 through resistors 22 and 28 for producing a control potential which will trigger transistor 14 to conduction with applied potentials exceeding the predetermined minimum.

The circuitry, not shown, to which the unknown potential is to be applied determines the value of the predetermined minimum. For example, with a circuit or a device which requires at least 12 volts for proper operation, it is necessary to determine whether or not the known potential is more or less than 12 volts. Therefore, in this instance, a 12 volt level would be the predetermined minimum at which indicator device 12 should be energized to produce the visual indication that the unknown applied potential is at least 12 volts. The Zener breakdown voltage plus the voltage drop across the series combination of resistors 22 and 28 should be 12 volts at the threshold of conduction. Therefore, the Zener diode 16 should be selected to have a breakdown voltage rating as determined by the resistors 22 and 28 and the potential magnitude selected as the predetermined minimum.

To provide a parallel voltage limiting circuit around indicator device 12 in the event the applied control potential exceeds the potential rating of this device, a second controllable switching device, herein shown as type PNP transistor 18 having the usual base or control, emitter and collector electrodes, is connected in shunt around indicator lamp 12.

To produce a control potential for triggering transistor 18 to conduction with applied potentials exceeding the rated potential of indicator device 12, a second potential sensitive circuit device characterized by the ability to become conductive with applied potentials exceeding its rated value, herein shown as a Zener diode 20, is connected in shunt across input terminals 6 and 8 through resistor 24.

Zener diode 20 should be selected to have a breakdown potential of the same order of magnitude as the rated potential of indicator lamp 12 so that with applied potentials exceeding this value, Zener diode 20 will conduct and produce a control potential which will trigger transistor switch 18 to conduction, thereby establishing a potential limiting circuit around indicator device 12.

In this device, there are two predetermined magnitudes of potential level which must be considered. The first is the predetermined minimum below which indicator device 12 is to give no indication and the second is the predetermined maximum potential corresponding to the rating of the indicator lamp 12. Therefore, Zener diodes 16 and 20 must become conducting with applied potentials exceeding a first predetermined magnitude and a second higher predetermined magnitude, respectively.

Resistors 22 and 24 are base return resistors for transistors 14 and 18, respectively, and resistor 26 is an emitter stabilizing resistor for transistor 14.

In operation, the unknown potential is applied across input terminals 6 and 8 and a conventional momentary contact switch 36 is pressed to close its contacts whereupon the applied potential appears across lines 32 and 34.

With an applied potential of a magnitude less than the predetermined minimum, Zener diode 16 remains nonconductive. With Zener diode 16 in the nonconductive state, the base-emitter bias potential across these electrodes of transistor 14 does not produce emitter-base current flow, therefore transistor 14 is nonconductive and the energizing circuit to indicator lamp 12 remains open.

With an applied potential of a magnitude which exceeds the predetermined minimum, Zener diode 16 breaks down and conducts. With Zener diode 16 conducting, a potential of a polarity more negative than that of line 32 appears at point 36. This control potential is applied to the control or base electrode of transistor 14 through a wire 38. Under these conditions, the base of transistor 14 is biased more negative than the emitter, a condition which produces base-emitter current flow and transistor 14 is biased to conduction.

With transistor 14 conducting, the energizing circuit for indicator lamp 12 is completed and current flows therethrough from the unknown source energizing lamp 12 which produces a visual indication that the unknown applied potential exceeds the predetermined minimum previously established. To limit the current through indicator lamp 12, a series resistor 30 may be included in this circuit.

In the event the unknown applied potential exceeds the predetermined maximum as established by the potential rating of indicator lamp 12, Zener diode 20 will break down and conduct and a control potential will appear at point 40 which is of a polarity more negative than that of line 32. This control potential is applied to the control or base electrode of transistor 18 through wire 45. With these conditions, the correct base-emitter bias potential appears across these electrodes of transistor 18 to produce emitter-base current flow, thereby triggering transistor 18 to conduction. With transistor 18 conducting, an auxiliary potential limiting circuit is established across indicator lamp thereby preventing its destruction.

It may be noted that with applied potentials less than the predetermined maximum, Zener diode 20 remains nonconductive as the base-emitter bias applied to transistor 18 does not permit emitter-base current flow.

FIGURE 2, wherein like elements have been given like characteristics of reference, schematically sets forth an alternate arrangement for the overpotential protection feature of this device. It may be noted that with this alternate arrangement, switching transistor device 18 and its base return resistor 24 are eliminated. In this circuit, with an applied potential in excess of the predetermined maximum magnitude, as established by the potential rating of indicator device 12, Zener diode 20 conducts.

Therefore, conducting diode 20 establishes the auxiliary potential limiting circuit across indicator lamp 12 to prevent its destruction. With this arrangement, Zener diode 20 must be of a considerably higher power rating than the comparable Zener diode 20 of the circuit in FIGURE 1.

Zener diode 20 of FIGURE 2 may be replaced by two series connected silicon diodes, poled for forward conduction. As silicon diodes do not conduct forward until the applied potential reaches one-half volt, with two silicon diodes in series, the voltage across the indicating device 12, which may be a 1.5 volt electric lamp, will not reach 1.5 volts, hence, it is protected from overload.

Resistor 28 is included in both circuits to produce a potential drop which is fixed at Zener diode 16 breakdown and variable thereafter and to function as a regulator to prevent excessive current through diode 16 upon initial conduction.

Although specific circuit elements such as Zener diodes for the potential sensitive devices, type PNP transistors for the controllable switching devices and an incandescent lamp for the indicating device have been set forth in this specification, it is to be specifically understood that other circuit elements having similar characteristics may be substituted therefor and the indicated potential polarities may be reversed without departing from the spirit of the invention.

This device has been found to be extremely valuable for quickly and accurately determining the condition of batteries. However, the utility of this device is not limited to this application.

While a preferred embodiment of the present invention has been shown and described, it will be obvious to those skilled in the art that various modifications and substitutions may be made without departing from the spirit of the invention which is to be limited only within the scope of the appended claims.

What is claimed is as follows:

1. A potential level indicating circuit having an over potential protection feature comprising, at least two input terminals, a load resistor connected across said input terminals, an energizable indicating device, a first and a second Zener diode each characterized by the ability to become conductive in a reverse direction with respective applied potentials exceeding a first predetermined magnitude and a second higher predetermined magnitude, a transistor having at least base, emitter and collector electrodes, means for connecting said emitter-collector electrodes of said transistor and said indicating device in series across said input terminals, a resistor, means for connecting said resistor and said first Zener diode in series across said input terminals, means for connecting said base electrode of said transistor to a junction between said resistor and said first Zener diode and means for connecting said second Zener diode in shunt across only said indicating device for establishing a parallel potential limiting circuit across said indicating device with applied potentials greater than said second higher predetermined magnitude.

2. A potential level indicating circuit having an over potential protection feature comprising, at least two input terminals, a load resistor connected across said input terminals, an energizable indicating device, a first and a second Zener diode each characterized by the ability to become conductive in a reverse direction with respective applied potentials exceeding a first predetermined magnitude and a second higher predetermined magnitude, a first transistor having at least base, emitter and collector electrodes, means for connecting said emitter-collector electrodes of said first transistor and said indicating device in series across said input terminals, a first resistor, means for connecting said first resistor and said first Zener diode in series across said input terminals, means for connecting said base electrode of said first transistor to a junction between said first resistor and said first Zener diode, a second transistor having at least base, emitter and collector electrodes, a second resistor, means for connecting said second resistor and said second Zener diode in series across said input terminals, means for connecting said base electrode of said second transistor to a junction between said second resistor and said second Zener diode and means for connecting said emitter-collector electrodes of said second transistor in shunt across only said indicating device for establishing a parallel potential limiting circuit across said indicating device with applied potentials greater than said second higher predetermined magnitude.

References Cited

FOREIGN PATENTS 1,121,187   1/1962   Germany.

JOHN W. CALDWELL, *Primary Examiner.*

D. MYER, *Assistant Examiner.*